H. Harpold,
Reciprocating Saw Mill,
N°17,677. Patented June 30, 1857.

UNITED STATES PATENT OFFICE.

HENRY HARPOLD, OF RACINE, OHIO.

ADJUSTABLE FENDER-POST FOR SAWMILLS.

Specification of Letters Patent No. 17,677, dated June 30, 1857.

*To all whom it may concern:*

Be it known that I, HENRY HARPOLD, of Racine, in the county of Meigs and State of Ohio, have invented certain new and useful Improvements in Sawing-Machines; and I do hereby declare that the following is a full, clear, and exact description of the same, reference being had to the accompanying drawings and to the letters of reference marked thereon.

The nature of my invention consists in constructing the fender posts in saw mills in such a manner that the slides may be so varied as to give the saw any desired pitch and also that when the saw has worn hollowing in the center the frame may be so adjusted as to accommodate itself to the shape of the saw, also in the arrangement of the jaws which will be hereinafter described.

In order that others skilled in the arts may use and manufacture my machine I will proceed to describe its operation and construction.

Figure 1:
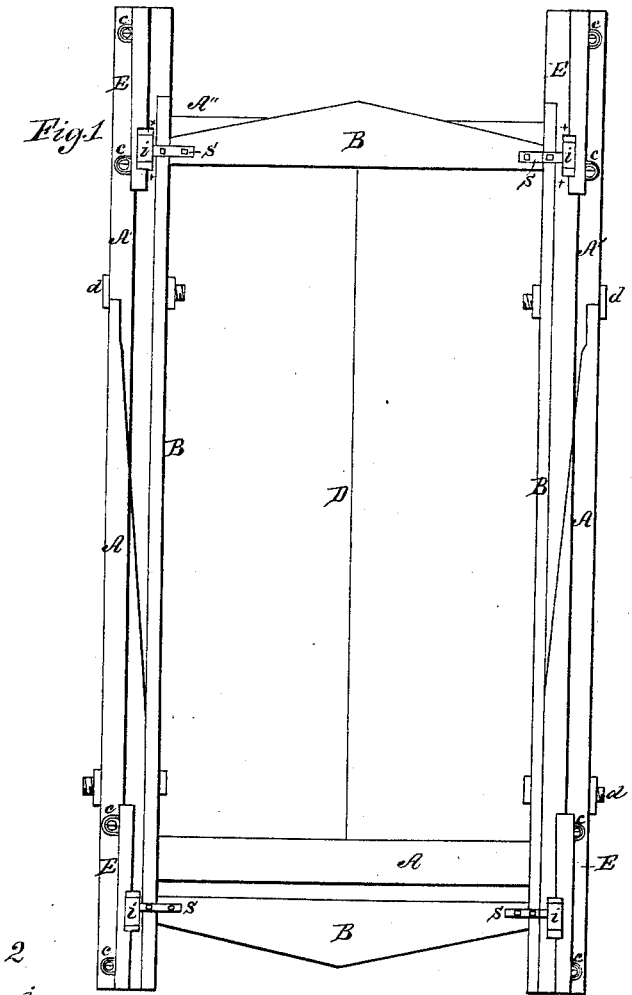
Figure 2:
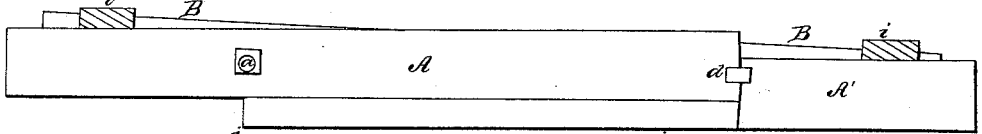
Figure 3:
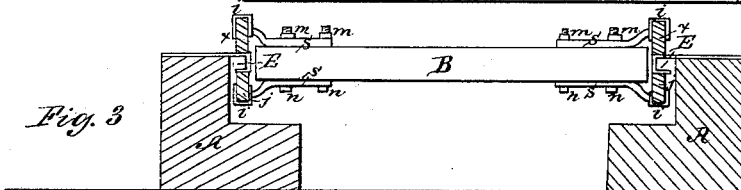

In the accompanying drawings which make a part of this specification Figure 1 is a plan view, Fig. 2 is a side view of the fender posts, Fig. 3 is an end view of the machine showing the position of the sash or gate and jaws.

In Fig. 1 A A′ are the fender posts which are made in two pieces and connected together by lap joints and secured by hook bolts. A″ are the fender beams to which the posts are attached. The fender posts are attached to the beams by bolts and work on a pivot in order that the posts may be easily adjusted. ($d\ d$) are hook bolts which pass through the fender posts at the point where the tap begins and serve to secure the two parts in any desired position. B is the saw sash and D is the saw. E are the slides attached to the fender posts, on which the saw sash slides, by the slotted arms marked $c$, into which a screw passes and by means of which the slides are adjusted. ($i$) are jaws which consist of wrought iron boxes, with two sides and a back. $x\ x$ are blocks of wood fitting in these boxes and are kept tight to the slides by means of wedges driven in from the back. ($s\ s$) are arms of these jaws pinned at one end to the gate or sash, the other end having a screw on its point passes through the jaws and a slot in the blocks, the jaws work on this arm longitudinally in the line $x\ x$, as seen in the figure in order to accommodate the gate to the slides when the fender posts change position.

In Fig. 2 A A′ are the two parts of one of the fender posts adjusted out of line, ($i$) are the jaws and B the saw sash ($d\ d$) hook bolts passing through the fender post.

In Fig. 3 A are the two ends of the fender posts, B the saw sash, ($i$), the box jaws, $x\ x$, the blocks in the jaws, E, the slides. $s\ s$, are the arms of the saw sash, ($n\ n$) are bolts attaching the jaw arms to the saw sash, and $m$ are nuts on these bolts.

In sawing with my machine each part of the saw is made to do its proportion of work; in giving the top of the saw any required set or pitch the bolts $d$ must be loosened and that part of the fender post marked A′ shoved in or out as the case may be and when the desired pitch is attained the bolts must again be tightened and the saw set in motion. The bottom of the saw may be regulated in like manner by the adjustment of the part marked A.

Should the saw be worn in the middle and consequently be hollowing the adjustment of both parts of the fender posts from the saw by pushing the two ends of the posts outward and securing them as described will cause the sash to traverse a curved line to suit the curve of the saw and thus each part or portion of the saw is made to perform its proportion of work.

The jaws ($i\ i$) working longitudinally on a swivel allow the gate or sash to traverse with perfect ease the curve given by the adjustment of the two parts of the fender posts.

Having thus fully described my invention what I claim and desire to secure is—

1. The fender posts arranged in two parts and adjustable, secured together by hook bolts, and working on a pivot on the fender beams all operating in the manner and for the purpose herein set forth and described.

2. I claim the jaws and blocks attached to the saw sash and working on a swivel arranged with the adjustable fender posts, for the purpose of giving the saw pitch and making it follow a desired curve as herein set forth and described.

HENRY HARPOLD.

Witnesses:
C. M. ALEXANDER,
T. G. CLAYTON.